United States Patent
Ma

(10) Patent No.: US 11,015,356 B2
(45) Date of Patent: May 25, 2021

(54) RACK ASSEMBLY FOR AN IN-FIELD 3D CONSTRUCTION PRINTER

(71) Applicant: Yingchuang Building Technique (Shanghai) Co., Ltd, Shanghai (CN)

(72) Inventor: Yihe Ma, Shanghai (CN)

(73) Assignee: Yingchuang Building Technique (Shanghai) Co., LTD., Shanghai (CN)

( * ) Notice: Subject to any disclaimer, the term of this patent is extended or adjusted under 35 U.S.C. 154(b) by 413 days.

(21) Appl. No.: 15/839,431

(22) Filed: Dec. 12, 2017

(65) Prior Publication Data

US 2018/0274250 A1    Sep. 27, 2018

(51) Int. Cl.

| | |
|---|---|
| E04G 21/04 | (2006.01) |
| B28B 1/00 | (2006.01) |
| B33Y 30/00 | (2015.01) |
| E04B 1/16 | (2006.01) |
| B33Y 40/00 | (2020.01) |
| E04B 1/35 | (2006.01) |
| B33Y 10/00 | (2015.01) |

(52) U.S. Cl.
CPC .............. *E04G 21/04* (2013.01); *B28B 1/001* (2013.01); *B33Y 30/00* (2014.12); *B33Y 40/00* (2014.12); *E04B 1/16* (2013.01); *B33Y 10/00* (2014.12); *E04B 1/3505* (2013.01)

(58) Field of Classification Search
None
See application file for complete search history.

(56) References Cited

U.S. PATENT DOCUMENTS

| 4,555,890 | A * | 12/1985 | Gartner | E04B 1/35 52/745.11 |
|---|---|---|---|---|
| 2010/0119336 | A1* | 5/2010 | Echauri Senosiain | B66C 17/00 414/10 |
| 2010/0207288 | A1* | 8/2010 | Dini | B28B 1/001 264/33 |
| 2014/0252668 | A1* | 9/2014 | Austin | B28B 3/20 264/40.7 |

FOREIGN PATENT DOCUMENTS

EP    0867581 A1 *  9/1998  .............. E04G 5/12

* cited by examiner

*Primary Examiner* — Peter L Vajda
*Assistant Examiner* — Adrianna N Konves
(74) *Attorney, Agent, or Firm* — Treasure IP Group, LLC

(57) ABSTRACT

The rack assembly of one 3D construction printer comprises two rows of vertical supporting posts anchored from the ground. Within each row of vertical supporting posts, between two neighboring vertical supporting posts, longitudinal beams are provided and extended along the length direction of the rack assembly, the longitudinal beams are configured to provide support and allow a cart carrying a 3D construction printer to move. On a top of the rack assembly, ring frame is provided, and on each of the longitudinal ends of the rows of vertical supporting beams, a cantilever extension end, being suspended, is connected to said rectangular ring frame. Further on the upper surface of a bottom longitudinal beam of the rectangular ring frame, guiding rails are provided in order for the cart carrying a crane to move along the longitudinal direction of the ring frame.

10 Claims, 1 Drawing Sheet

RACK ASSEMBLY FOR AN IN-FIELD 3D CONSTRUCTION PRINTER

CROSS REFERENCE TO RELATED APPLICATION

This application claims priority to a Chinese Application No. 201710185673.2, filed on Mar. 26, 2017. The Chinese Application is incorporated herein by reference in its entirety.

TECHNICAL FIELD

This invention relates to a building construction machinery, specifically to a rack assembly for an in-field 3D construction printer.

BACKGROUND TECHNOLOGY

In the existing technology, the construction of an exterior wall, insulation and exterior wall decoration for most buildings is basically implemented in steps. During exterior wall construction, the interior/exterior molds are required. For insulation and exterior wall decoration, it is necessary to set up a scaffold, however bringing such scaffold structure can complicate a construction procedure, cause long construction time and create heavy material wasting. In recent years, with the progress of digital technology, some building members can be implemented with a 3D printing technology in a plant building, and the building members from the digital print can be sent to the field for installation. But this is not a field print, and it is still a distance away from a truly 3D printed building. Field print means printing on the spot, in the field. Even for the buildings printed on the spot in the field, following problems occurs. For example, 3D printing head has to rise as the height of the building increases, so far there is not a good method to achieve the height management, therefore the current 3D printed building is only limited to one or two floors in height. Another prominent issue is that the cement concrete mortar required by the 3D printing has even poorer ability to flow and is more difficult to transport, compared with cement concrete mortar used in the traditional process. In addition, simultaneous construction of water and electricity equipment and a series of other issues have yet to be resolved. The technology of printing buildings needs to be further improved.

SUMMARY OF THE INVENTION

The objective of this invention is to provide a rack assembly for a 3D construction printer which has a simple structure and can be operated very conveniently. The rack assembly in the present invention is aimed to overcome the existing technical issues in the 3D construction printing.

The present invention is achieved through the following technical solutions. The rack assembly of one 3D construction printer comprises two rows of vertical supporting posts anchored from the ground, separated by a first predetermined distance along a lateral direction (a width direction of the rack assembly), disposed in symmetrical arrangements, wherein each row of vertical supporting posts consists essentially of a plurality of vertical supporting posts along a longitudinal direction (a length direction of the rack assembly), spaced apart from each other with a second pre-determined distance and anchored from the ground. Within each row of vertical supporting posts, between two neighboring vertical supporting posts, longitudinal beams are provided and extended along the length direction of the rack assembly, and longitudinal beams placed symmetrically on inner sides of vertical supporting post, across from each other, the longitudinal beams are configured to provide support and allow a cart carrying a 3D construction printer to move in the longitudinal direction of the rack assembly. Said longitudinal beams are uniformly distributed along a height direction of the vertical supporting beams, and on upper surface of the longitudinal beams disposed are guiding rails for the movement of the cart carrying the 3D construction printer. On a top of the rack assembly, from one row to the other row of the vertical supporting posts, a rectangular ring frame is provided, which is formed by another sets of lateral and longitudinal beams, and on each of the longitudinal ends of the rows of vertical supporting beams, a cantilever extension end, being suspended, is connected to said rectangular ring frame. Further on the upper surface of a bottom longitudinal beam of the rectangular ring frame, guiding rails are provided in order for the cart carrying a bridge crane to move along the longitudinal direction of the rectangular ring frame.

There is a canopy on the top of said rectangular ring frame.

Compared with the existing technology, the rack structure for a field building 3D printer, disclosed in this invention, has the following advantages. In this invention, after the 3D construction printer is placed on the longitudinal beam of the rack structure, the 3D construction printer can start work according to a predetermined a sequence of procedures. The bridge crane located on the rectangular ring frame of the rack can not only continuously feed material supply to the 3D construction printer, but also can lift and move the 3D construction printer onto the longitudinal beam from a bottom floor to an upper floor for continued printing. The rack assembly for an in-field 3D construction printer disclosed in the present invention enables continuous working of the 3D construction printer.

DESCRIPTION OF THE EMBODIMENTS

Figure 1:
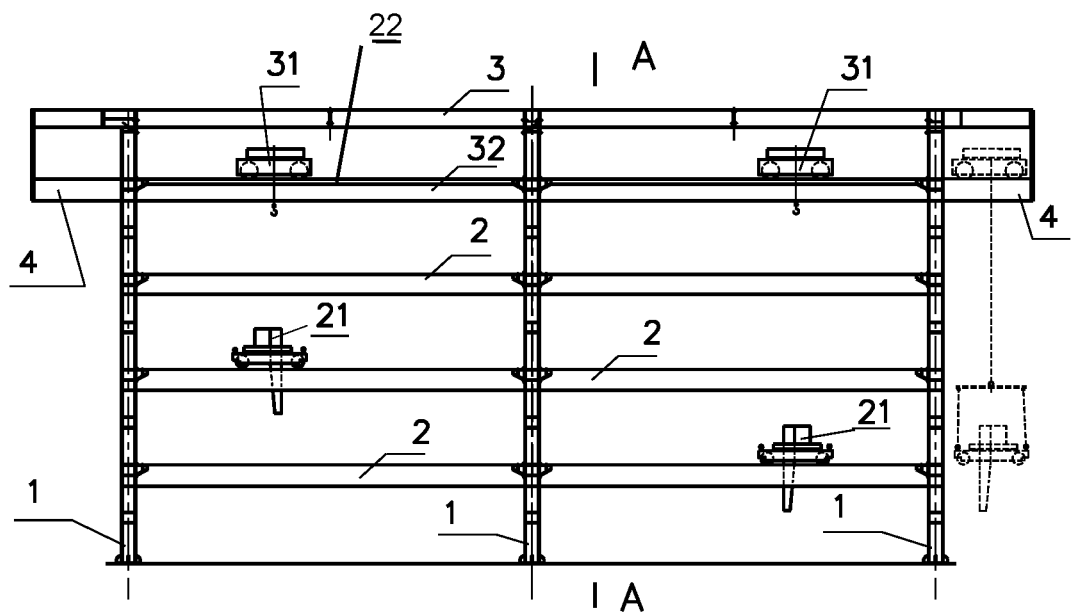
FIG. 1 is the schematic diagram for the rack assembly in one embodiment of this invention, which illustrates a front view.
Figure 2:
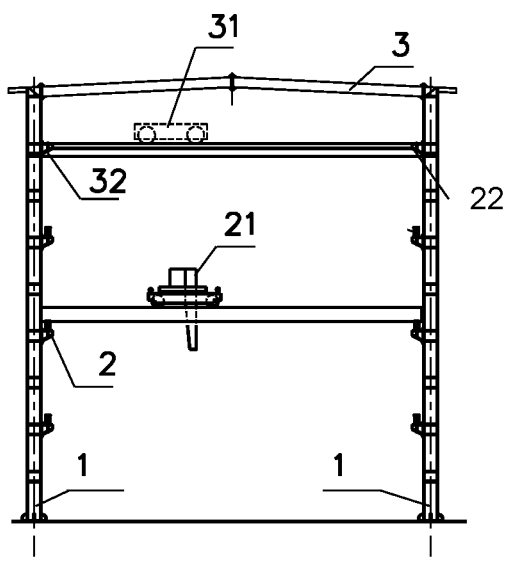
FIG. 2 is a cross sectional view of the rack assembly in the embodiment of this invention in FIG. 1, along A-A line.

This invention is further described in combination with the embodiments below. The rack assembly disclosed as one embodiment of the present invention, which illustrates a front view in the FIG. 1. The rack assembly of a 3D construction printer comprises of two rows of vertical supporting posts 1 anchored from the ground, separated by a first predetermined distance along a lateral direction (a width direction of the rack structure), disposed in symmetrical arrangements, wherein each row of vertical supporting posts 1 comprises a plurality of individual vertical supporting posts 1 along a longitudinal direction (a length direction of the rack structure), spaced apart from each other with a second pre-determined distance and anchored from the ground. Within each row of vertical supporting posts 1, between two neighboring vertical supporting posts 1, longitudinal beams 2 are provided and extended along the length direction of the rack structure, and longitudinal beams 2 placed symmetrically in the two rows of vertical supporting posts 1, and on inner sides of vertical supporting posts, across from each other, the longitudinal beams are configured to provide support and allow a cart carrying a 3D construction printer 21 to move along the longitudinal direction of the rack assembly. Said longitudinal beams are uniformly distributed along a height direction of the vertical supporting beams assembly, and on upper surface of the longitudinal beams 32 disposed are guiding rails 22 for the movement of the cart carrying the 3D construction printer 21. On a top of the rack structure, from one row to the other row of the vertical supporting posts, a rectangular ring frame 3 is provided, which is formed by another sets of lateral and longitudinal beams, and on both longitudinal ends of the rows of vertical supporting beams, a cantilever 4 extension end is provided, being suspended, and connected to said rectangular ring frame. Further on the upper surface of a bottom longitudinal beam of the rectangular ring frame, guiding rails are provided in order for the cart carrying a bridge crane 31 to move along the longitudinal direction of the rectangular ring frame 3.

In this invention, the following measures will be further taken: there is the canopy on the top of said rectangular ring frame. Such structure can still ensure the work even in the rainy days.

The present invention is accomplished according to the following work principles and executes in the following method steps. The present invention provides a rack for a 3D construction printer. The method to build a house using the rack according to the aspects of the present invention and a 3D construction printer is described below. First, providing drawings on the ground where a house is going to be built and determining the number of required vertical supporting posts and the distance between the two rows of the vertical supporting posts, according to the size of the house to be built. In one embodiment of the present invention, two rows of 3 vertical supporting posts are required. Then, the method further comprises according to the height of the house to be built, determining the number of longitudinal beams that is used to support for 3D construction printer to move in the horizontal direction, which is the direction along the length of the rack. For example, in the same embodiment of the present invention, three longitudinal beams are used in three bottom floors of the rack. In each floor, guiding rails are laid on the surface of the longitudinal beams. The 3D construction printer itself has three moving mechanisms. A first moving mechanism can drive the 3D construction printer to move along the rails on the longitudinal beam. A second moving mechanisms is to make the 3D construction printer to move between the two rows of vertical supporting posts using self-provided guide rails. A third moving mechanisms is to allow the 3D construction printer to move in the vertical direction when the 3D construction printer is positioned on the longitudinal beams of the rack, moving up and down, using the self-provided guiding rails. The 3D construction printer can print a housing structure according to a preset program by its own moving mechanisms once it is placed on the guided rails of the longitudinal beams of the rack disclosed in the present invention.

When the house to be built is relatively high, and the vertical movement of 3D construction printer using its self-provided guiding rails and movement mechanism cannot move that high, then the 3D construction printer need to be lifted to guiding rails on a higher floor of the rack to continue the printing. The lift is accomplished by a crane on a rectangular ring frame of the rack. The 3D construction printer is first removed off from the longitudinal beams by a crane, then it is moved to below an overhanging cantilever of the rectangular ring frame as the crane moves, and subsequently the 3D construction printer is delivered to the height of the desired longitudinal beam and transferred over and placed on to the desired guiding rails on the longitudinal beams rails. Further, according to the aspects of the present invention, the crane placed in the rectangular ring frame of the rack can not only lift and deliver the 3D construction printer as describe, the cement concrete slurry is also delivered to a storage hopper of the 3D construction printer through the crane, so that the 3D construction printer can print continuously.

ELEMENTS IN THE INVENTIONS ARE

1—vertical supporting post
2—longitudinal beams
3—rectangular ring frame
9—lateral beams
21—3D construction printer
32—longitudinal beam of the rectangular ring frame
31—crane The structure in this invention has been described in combination with the attached drawings and the embodiment, and it does not constitute a restriction to this invention. A person skilled in this art can make the adjustment according to the actual need, and the changes or modifications made within the scope of the claims shall be within the scope of the invention to be protected.

It is claimed:

1. A 3D construction system, comprising
[a] a rack assembly configured to support a 3D construction printer to print in a target area enclosed by the rack assembly, comprising
[b] two rows of vertical supporting posts, anchored from ground, separated by a first predetermined distance along a lateral direction (a width direction of the rack assembly), disposed in symmetrical arrangements, wherein
  each row of vertical supporting posts consists essentially of a plurality of vertical supporting posts along a longitudinal direction (a length direction of the rack assembly), spaced apart from each other with a second pre-determined distance;
[c] longitudinal beams, provided within each row of vertical supporting posts, between two neighboring vertical supporting posts, extended along the length direction of the rack assembly, and placed symmetrically on inner sides of vertical supporting post, across from each other, wherein the longitudinal beams are configured to provide support and allow a cart carrying the 3D construction printer to move in the longitudinal direction of the rack assembly, and
  said longitudinal beams are uniformly distributed along a height direction of the vertical supporting posts, and on an upper surface of the longitudinal beams disposed are guiding rails for the movement of the cart carrying the 3D construction printer;
[d] a rectangular ring frame, provided on a top of the rack assembly,
  from one row to the other row of the vertical supporting posts, formed by another sets of lateral and longitudinal beams, and wherein
  on each of the longitudinal ends of the rows of vertical supporting beams, a cantilever extension end, being suspended, is connected to said rectangular ring frame,
  on an upper surface of a bottom longitudinal beam of the rectangular ring frame, guiding rails are provided in order for a cart carrying a bridge crane to move along the longitudinal direction of the rectangular ring frame, and the cantilever extension end is configured to move the 3D printer outside of the rack assembly vertically;

[e] wherein the 3D construction printer configured to work according to a predetermined sequence of procedures;

the bridge crane located on the rectangular ring frame of the rack assembly is configured to continuously feed material supply to the 3D construction printer, and lift and move the 3D construction printer onto the longitudinal beam from a bottom floor to an upper floor for continued printing; and cement concrete slurry is delivered to a storage hopper of the 3D construction printer by the bridge crane the 3D construction system is configured to print higher than two floors.

2. The 3D construction system of claim 1, further comprises a canopy on top of said rectangular ring frame, connected between two vertical supporting posts, covering the area enclosed by the rack assembly.

3. A method using a 3D construction printer for in field construction printing, comprising building a rack assembly configured to support a 3D construction printer to print in a target area enclosed by the rack assembly, comprising two rows of vertical supporting posts, anchored from ground, separated by a first predetermined distance along a lateral direction (a width direction of the rack assembly), disposed in symmetrical arrangements, wherein each row of vertical supporting posts consists essentially of a plurality of vertical supporting posts along a longitudinal direction (a length direction of the rack assembly), spaced apart from each other with a second pre-determined distance;

longitudinal beams, provided within each row of vertical supporting posts, between two neighboring vertical supporting posts, extended along the length direction of the rack assembly, and placed symmetrically on inner sides of vertical supporting post, across from each other, wherein the longitudinal beams are configured to provide support and allow a cart carrying the 3D construction printer to move in the longitudinal direction of the rack assembly, and said longitudinal beams are uniformly distributed along a height direction of the vertical supporting posts, and on an upper surface of the longitudinal beams disposed are guiding rails for the movement of the cart carrying the 3D construction printer;

a rectangular ring frame, provided on a top of the rack assembly, from one row to the other row of the vertical supporting posts, formed by another sets of lateral and longitudinal beams, and wherein on each of the longitudinal ends of the rows of vertical supporting beams, a cantilever extension end, being suspended, is connected to said rectangular ring frame, on an upper surface of a bottom longitudinal beam of the rectangular ring frame, guiding rails are provided in order for a cart carrying a bridge crane to move along the longitudinal direction of the rectangular ring frame, and the cantilever extension end is configured to move the 3D printer outside of the rack assembly vertically;

wherein the 3D construction printer is configured to work according to a predetermined sequence of procedures; the bridge crane located on the rectangular ring frame of the rack assembly is configured to continuously feed material supply to the 3D construction printer, and lift and move the 3D construction printer onto the longitudinal beam from a bottom floor to an upper floor for continued printing; and cement concrete slurry is delivered to a storage hopper of the 3D construction printer by the bridge crane the 3D construction system is configured to print higher than two floors, comprising providing drawings on the ground where a house is going to be built and determining a number of required vertical supporting posts and a first distance between the two rows of the vertical supporting posts, according to the size of the house to be built;

determining the number of longitudinal beams that is used to support for 3D construction printer to move in the horizontal direction;

laying down guiding rails on the surface of the longitudinal beams for each floor;

and providing 3D construction printer having three moving mechanisms, including a first moving mechanism to drive the 3D construction printer to move along the rails on the longitudinal beam; a second moving mechanisms to make the 3D construction printer to move between the two rows of vertical supporting posts using self-provided guide rails; and a third moving mechanisms to allow the 3D construction printer to move in the vertical direction when the 3D construction printer is positioned on the longitudinal beam.

4. The method of claim 3, wherein the rack consists essentially of two rows of 3 vertical supporting posts.

5. The method of claim 3, wherein three longitudinal beams are used in three bottom floors of the rack assembly.

6. The 3D construction system of claim 1, wherein the rack assembly includes two rows of 3 vertical supporting posts, including two corner vertical supporting posts and one center vertical supporting post.

7. The 3D construction system of claim 1, wherein the rack assembly further comprises a lateral supporting beam, placed to connect middle positions of a pair of vertical supporting posts.

8. The 3D construction system of claim 1, wherein bottom floors of the rack assembly include three longitudinal beams.

9. The 3D construction system of claim 1, wherein hooks of bridge cranes are suspended outside of the rack assembly configured to lift 3D printers externally from the rack assembly.

10. The 3D construction system of claim 1, wherein the lateral beams of the rectangular ring frame are provided with guiding rails, configured to move bridge cranes laterally.

* * * * *